(12) United States Patent
Sorrentino et al.

(10) Patent No.: US 10,644,833 B2
(45) Date of Patent: May 5, 2020

(54) REDUCING OVERHEAD IN SIDELINK TRANSMISSIONS

(71) Applicant: Telefonaktiebolaget LM Ericsson (publ), Stockholm (SE)

(72) Inventors: Stefano Sorrentino, Solna (SE); Ricardo Blasco Serrano, Espoo (FI); Hieu Do, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/324,255

(22) PCT Filed: Aug. 11, 2017

(86) PCT No.: PCT/SE2017/050815
§ 371 (c)(1),
(2) Date: Feb. 8, 2019

(87) PCT Pub. No.: WO2018/030949
PCT Pub. Date: Feb. 15, 2018

(65) Prior Publication Data
US 2019/0173613 A1 Jun. 6, 2019

Related U.S. Application Data

(60) Provisional application No. 62/374,220, filed on Aug. 12, 2016.

(51) Int. Cl.
*H04L 1/00* (2006.01)
*H04L 25/02* (2006.01)
(Continued)

(52) U.S. Cl.
CPC .......... *H04L 1/0029* (2013.01); *H04L 1/0038* (2013.01); *H04L 5/0023* (2013.01);
(Continued)

(58) Field of Classification Search
CPC ... H04L 1/0029; H04L 1/0038; H04L 5/0023; H04L 5/0048; H04L 25/0222; H04W 4/40
See application file for complete search history.

(56) References Cited

U.S. PATENT DOCUMENTS 9,531,448 B2 * 12/2016 Sesia ...................... H04B 7/024
9,930,515 B2 *  3/2018 Park ...................... H04L 5/0048
(Continued)

FOREIGN PATENT DOCUMENTS

EP          2367385 A1     9/2011
WO    WO2015/047141 A1 *  2/2015  ............ H04W 56/00

OTHER PUBLICATIONS

International Search Report and Written Opinion of the International Searching Authority, PCT/SE2017/050815, dated Oct. 18, 2017, 15 pages.

*Primary Examiner* — James M Perez
(74) *Attorney, Agent, or Firm* — Sage Patent Group

(57) ABSTRACT

A method includes receiving a first transmission; assessing a channel property of the first transmission; receiving a second transmission; determining if a corresponding channel property of the second transmission can be estimated based on the channel property of the first transmission; in response to determining that the corresponding channel property of the second transmission can be estimated based on the channel property of the first transmission by determining that transmission resources used for the first and second transmissions are sufficiently close in time and/or frequency domains that a channel property is common to both transmissions, estimating the corresponding channel property of the second transmission based on the channel property of the first transmission; and detecting the second transmission using the estimated corresponding channel property of the second transmission.

20 Claims, 10 Drawing Sheets

(51) Int. Cl.
*H04L 5/00* (2006.01)
*H04W 4/40* (2018.01)

(52) U.S. Cl.
CPC ........ *H04L 5/0048* (2013.01); *H04L 25/0222* (2013.01); *H04W 4/40* (2018.02)

(56) References Cited

U.S. PATENT DOCUMENTS

| | | | | |
|---|---|---|---|---|
| 9,961,573 | B2* | 5/2018 | Kazmi | H04W 24/08 |
| 10,284,393 | B2* | 5/2019 | Sorrentino | H04W 84/18 |
| 10,448,365 | B2* | 10/2019 | Blasco Serrano | H04L 5/0007 |
| 2010/0202301 | A1* | 8/2010 | Wen | H04L 25/0216 370/252 |
| 2013/0003584 | A1* | 1/2013 | Alriksson | H03G 3/3052 370/252 |
| 2013/0272262 | A1* | 10/2013 | Li | H04L 5/14 370/330 |
| 2014/0003262 | A1* | 1/2014 | He | H04W 4/70 370/252 |
| 2014/0293968 | A1* | 10/2014 | Ebrahimi Tazeh Mahalleh | H04W 56/001 370/336 |
| 2014/0328329 | A1* | 11/2014 | Novlan | H04W 72/042 370/336 |
| 2015/0349855 | A1* | 12/2015 | Sesia | H04B 7/024 370/252 |
| 2016/0241420 | A1* | 8/2016 | Sorrentino | H04W 84/18 |
| 2017/0048038 | A1* | 2/2017 | Seo | H04L 5/0048 |
| 2017/0086176 | A1* | 3/2017 | Seo | H04L 1/00 |
| 2018/0288737 | A1* | 10/2018 | Islam | H04W 72/042 |
| 2018/0331860 | A1* | 11/2018 | Bergman | H04L 5/0023 |
| 2019/0229792 | A1* | 7/2019 | John Wilson | H04B 7/0626 |
| 2019/0268117 | A1* | 8/2019 | Nilsson | H04B 7/088 |
| 2019/0306923 | A1* | 10/2019 | Xiong | H04L 27/261 |

* cited by examiner

Determining that the transmission resources used for the first and second transmissions are sufficiently close in the time and/or frequency domains that a large scale channel property is common to both transmissions

Estimating the channel property from the first transmission and the second transmission

Transmitting first and second contiguous subframes to a receiver over a wireless communication channel while omitting overhead symbol between subframes

Receiving first and second contiguous subframes at a receiver over a wireless communication channel

1502

Detecting data in the second subframe based on an AGC symbol in the first subframe

REDUCING OVERHEAD IN SIDELINK TRANSMISSIONS

CROSS REFERENCE TO RELATED APPLICATIONS

This application is a 35 U.S.C. § 371 national stage application of PCT International Application No. PCT/SE2017/050815 filed on Aug. 11, 2017, which in turn claims domestic priority to U.S. Provisional Patent Application No. 62/374,220 filed on Aug. 12, 2016, the disclosures and content of which are incorporated by reference herein in their entirety.

TECHNICAL FIELD

The present disclosure relates to methods and operations by network nodes and user equipments for scheduling and decoding sidelink transmissions in a telecommunications system.

BACKGROUND

During Release 12, the LTE standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. The applications can exchange information through direct communications based on physical channels terminated directly between the devices.
Vehicle-to-X (V2X) Communications D2D communications may be extended to support Vehicle-to-X (V2X) communication, which includes any combination of direct communication between vehicles, pedestrian carried devices, and infrastructure mounted devices. V2x communication may take advantage of available network (NW) infrastructure, although at least basic V2x connectivity can be possible in case of lack of available network infrastructure. Providing an LTE-based V2x interface may be economically advantageous because of the LTE economies of scale and it may enable tighter integration between communications with the NW infrastructure (vehicle-to-infrastructure (V2I)), (vehicle-to-pedestrian (V2P)), and (vehicle-to-vehicle (V2V)) communications, as compared to using a dedicated V2x technology.

V2x communications may carry both non-safety and safety information, where each of the applications and services may be associated with specific communication operational requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify their presence and other relevant parameters in a broadcast fashion. Such messages target other vehicles, pedestrians, and infrastructure, and are handled by their applications. A CAM message also serves as active assistance to safety driving for normal traffic. Devices check availability of a CAM message every 100 ms, yielding a maximum detection latency requirement of less than or equal to 100 ms for most CAM messages.

A DENM message is event-triggered, such as by braking, and the availability of a DENM message is also checked for every 100 ms.

Depending on the use case, latency requirements for CAM and DENM may vary significantly. As an example, latency may vary from 20 ms for pre-crash warnings to 100 ms for emergency stop or queue warnings, and may be up to 1000 ms for non-safety related use cases such as traffic flow optimization, curve speed warnings, etc.

The package size of CAM and DENM message can vary from more than 100 to more than 800 bytes, although the typical size is around 300 bytes depending on the specific V2X use case, message type (e.g. DENM can be larger than CAM), and depending on the security format included in the packet (e.g., full certificate or certificate digest). The message is supposed to be detected by all vehicles in proximity.

The Society of the Automotive Engineers (SAE) has defined a Basic Safety Message (BSM) for DSRC with various defined messages sizes. Based on the importance and urgency of the messages, the BSMs are further classified into different priorities.

Each subframe in a sidelink communication incurs a fixed overhead in the first symbol for AGC training and in the last symbol for a guard band. Such overhead may affect link and system performance.

The approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

A method by a user equipment, UE, according to some embodiments includes receiving a first transmission; assessing a channel property of the first transmission; receiving a second transmission; determining if a corresponding channel property of the second transmission can be estimated based on the channel property of the first transmission; in response to determining that the corresponding channel property of the second transmission can be estimated based on the channel property of the first transmission, estimating the corresponding channel property of the second transmission based on the channel property of the first transmission; and detecting the second transmission using the estimated corresponding channel property of the second transmission. Determining if a corresponding channel property of the second transmission can be estimated based on the channel property of the first transmission includes determining that transmission resources used for the first and second transmissions are sufficiently close in time and/or frequency domains that a channel property is common to both transmissions.

Some potential benefits that may be provided by this method include reduction in the use of overhead resources for communication, resulting in more efficient utilization of resources. Some embodiments may also allow improved link performance in terms of error probability, which can result in gains at the system level.

The method may further include in response to determining that the corresponding channel property of the second transmission cannot be estimated based on the channel property of the first transmission, estimating the corresponding channel property of the second transmission based on the second transmission.

Estimating the corresponding channel property of the second transmission may include estimating the corresponding channel property of the second transmission based on the channel property of the first transmission and based on the second transmission.

The channel property of the first transmission and the corresponding channel property of the second transmission may include a large scale channel property. In some embodiments, the channel property of the first transmission and the corresponding channel property of the second transmission may include at least one of a channel gain, a received power, a Doppler spread, a Doppler shift and a delay spread.

Determining if a corresponding channel property of the second transmission can be estimated based on the channel property of the first transmission may include determining that spatial precoders used for the first and second transmissions are sufficiently close that a large scale channel property is common to both transmissions.

Determining if a corresponding channel property of the second transmission can be estimated based on the channel property of the first transmission may include determining that the first and second transmissions include contiguous subframes.

Determining if a corresponding channel property of the second transmission can be estimated based on the channel property of the first transmission may include determining that the first and second transmissions utilize the same bandwidth.

The channel property may include received power, and the method may further include, in response to determining that the corresponding channel property of the second transmission cannot be estimated based on the channel property of the first transmission, adjusting an automatic gain control based on an initial portion of the second transmission.

A user equipment, UE, according to some embodiments includes a transceiver; at least one processor circuit; and at least one memory coupled to the at least one processor circuit and the transceiver, and storing program code that when executed by the at least one processor circuit causes the at least one processor circuit to perform operations including receiving a first transmission; assessing a channel property of the first transmission; receiving a second transmission; determining if a corresponding channel property of the second transmission can be estimated based on the channel property of the first transmission; in response to determining that the corresponding channel property of the second transmission can be estimated based on the channel property of the first transmission, estimating the corresponding channel property of the second transmission based on the channel property of the first transmission; and detecting the second transmission using the estimated corresponding channel property of the second transmission, wherein determining if a corresponding channel property of the second transmission can be estimated based on the channel property of the first transmission includes determining that transmission resources used for the first and second transmissions are sufficiently close in time and/or frequency domains that a channel property is common to both transmissions.

A method by a scheduler in a network node includes scheduling first and second sidelink transmissions of a wireless transmitting node such that they are close enough in a dimension that they will be regarded at a wireless receiving node as quasi co-located transmissions; and causing the wireless transmitting node to transmit the second sidelink transmission to the wireless receiving node without at least one overhead symbol that is present in the first transmission.

The dimension may include time, frequency and/or space.

The method may include causing the wireless transmitting node to increase a coding redundancy of the second transmission.

The at least one overhead symbol may include an automatic gain control, AGC, training symbol.

The at least one overhead symbol may include a guard period, GP.

The method may further include transmitting a data symbol in place of the at least one overhead symbol.

A network node according to some embodiments includes at least one processor circuit; and at least one memory coupled to the at least one processor circuit and storing program code that when executed by the at least one processor circuit causes the at least one processor circuit to perform operations including scheduling first and second sidelink transmissions of a wireless transmitting node such that they are close enough in a dimension that they will be regarded at a wireless receiving node as quasi co-located transmissions; and causing the wireless transmitting node to transmit the second sidelink transmission to the wireless receiving node without at least one overhead symbol that is present in the first sidelink transmission.

BRIEF DESCRIPTION OF THE DRAWINGS

The accompanying drawings, which are included to provide a further understanding of the invention and are incorporated in and constitute a part of this application, illustrate certain embodiments of the invention. In the drawings:

FIGS. 2-6 are flowcharts of methods and operations that can be performed by a UE in accordance with various embodiments of the present disclosure.

FIGS. 13-15 are flowcharts of methods and operations that can be performed by a UE in accordance with further embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Although various embodiments are described herein in the context of sidelink (device-to-device) and/or uplink (device-to-network) communications, it will be appreciated that some embodiments of the inventive concepts may be applied to various other types of communications.

Some embodiments of the present disclosure provide methods of processing received sidelink transmissions in a D2D communication environment when detecting transmissions that are close in a dimension, such as in time, frequency and/or space. According to some embodiments, a receiver may apply different types of processing to received transmissions depending whether the transmissions are sufficiently close in some appropriate sense. Receiver parameters, such as large scale channel properties, can be inferred from a sufficiently close previous transmission. The receiver parameters inferred from the previous transmission can be used to process a subsequently received transmission. Further optimization may be possible at the receiver due to the fact that estimations can be reused.

In some embodiments, a scheduling node takes into account the receiver behavior, and schedules sidelink transmissions so that the receiver can process the transactions with reduced overhead. The scheduling function can be implemented in the transmitting node or in a separate scheduler node.

Figure 1:
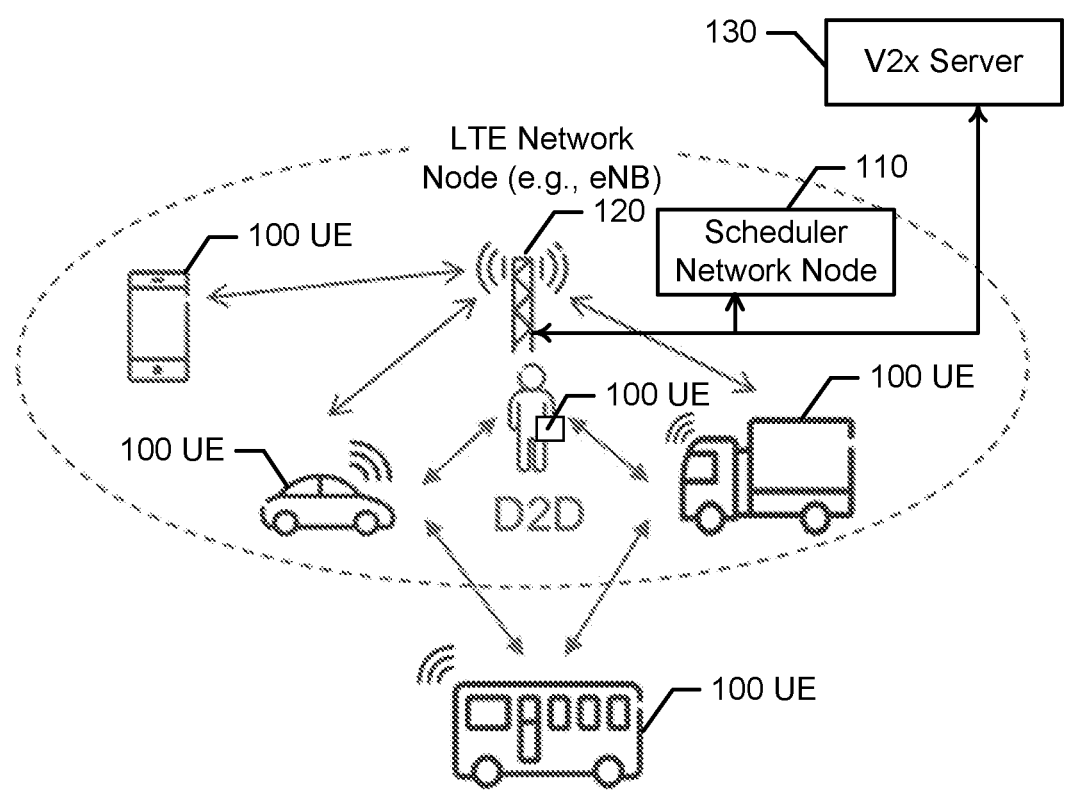
FIG. 1 illustrates a block diagram of a communication system that includes UEs configured for V2x communication of packets using radio resource assignment from a scheduler network node in accordance with various embodiments of the present disclosure.

Embodiments of the present disclosure are described without limitation in the context of a communication system shown in the block diagram of FIG. 1. The communication system includes a radio network node 120 (e.g., a LTE eNB), a scheduler network node 110 (e.g., an eNB scheduler), and a plurality of UEs 100. The UEs 100 can be any type of electronic device configured for V2x communications such as any one or more of: vehicle-to-infrastructure (V2I) communications; vehicle-to-pedestrian (V2P) communications; and vehicle-to-vehicle (V2V) communications. Example types of a UE 100 include, but not limited to, a personal data assistant (PDA), tablet computer (e.g., iPAD), mobile terminal, smart phone, smart watch, laptop embedded equipped (LEE), laptop mounted equipment (LME), vehicle mounted communication device, infrastructure mounted communication device, etc.

Some or all of the operations disclosed herein as being performed by the scheduler network node 110 may instead by performed by the radio network node 120 or vice versa.

Some potential benefits that may be provided by one or more of these embodiments and/or other embodiments disclosed below, include reduction in the use of overhead resources for communication, resulting in more efficient utilization of resources. Some embodiments may also allow improved link performance in terms of error probability, which can result in gains at the system level. The advantages, at a system level, of the embodiments are many. For example, a more efficient utilization of the resources may allow the system to serve more users. Similarly, reducing the overhead resourcing for communication free-up resources which may also be used to serve more users. Improving the error probability may for example yield better cell-boundary performance.

The principles described herein may in general be applied in scenarios where a central scheduler (e.g., an eNB or access point) assigns radio resources for use in transmissions by a UE 100 or other device. The data to be transmitted is available in the UE 100, e.g., provided by an application processed by the UE 100. Example applications include sidelink transmission where the eNB 120 controls the resources used by the UE 100 to transmit to another UE 100 and UL transmission where the reception of data happens at some network node.

Although the embodiments described herein primarily relate to sidelink operations, they can be extended by a person skilled in the art to other operation as well. In particular, the embodiments are described below in the context of providing V2X/ITS services over a mobile wireless network. However, various embodiments may be applied to any receiver in the context of sidelink (D2D) transmissions or even in the context of cellular transmissions. Moreover, although various embodiments are described in the context of a 3GPP LTE communication system, the embodiments herein can be used with other types of communication systems.

In order to correctly detect a signal, a receiver may first estimate a number of reception-related parameters including, for example, so called large scale channel properties. These properties include, without limitation, channel gain, received power, Doppler spread, Doppler shift and delay spread. In the exemplary embodiments. Large scale properties may refer to channel properties and related parameters which varies slowly with changes in position and/or time and/or frequency. Large scale within the present embodiments may be interpreted by skilled person as distances which are large compared to distances in mobility of devices within a telecommunication system, e.g. compared to the size of a cell. Similarly, the large scale can also be considered as large in comparison to a duration of a transmission (e.g., of a symbol, a packet, or an entire communication) or large scale compared to the bandwidth of a transmission (e.g., of a subcarrier, a resource block, or an entire packet).

Large scale properties can be exploited by the receiver to initialize, adjust and perform various processing of a time and/or frequency domain signal. For example, the power (or related metric) of an incoming signal may be used to adjust the gain control (AGC, or automatic gain control) at the receiver. After the gain control has been adjusted, the remaining part of the received signal may be processed. For sidelink communications, for example, the first symbol of each sidelink subframe is typically used by the receiver for determining the gain to be used to process the remaining part of the subframe.

The correlation properties of a radio channel determine whether the channels associated with different received signals exhibit similar large scale channel properties, or not. For example, transmissions by a given transmitter may experience different channel properties when different transmissions occur at different time instances, over different frequency bands and/or using different spatial processing (e.g., beamforming). Additionally, the received signal properties may vary, because the transmitter(s) may change some signal properties (such as power) from transmission to transmission.

A large scale channel property that is assessed or determined for a certain transmission may be accurate enough to be used for other transmissions that are sufficiently close in time and/or frequency and/or spatial domains. For example, two transmissions may be close in the spatial domain if the transmissions use sufficiently similar spatial precoders in connection with multiantenna communications. According to some embodiments, a receiver may not need to assess the gain for each transmission independently, but may exploit channel properties already available for a first transmission to aid detection of a second transmission. As an example, a previously estimated gain for a first transmission can be reused to aid AGC processing (and possibly any other receiver processing) for a second transmission, provided that the received power is expected to be sufficiently similar between the first and second transmissions. The receiver may even jointly exploit various transmissions in order to improve the estimation of the common large scale channel properties. As an example, a receiver may average several measurements of the delay spread to improve the accuracy of its estimate, provided that the Doppler spread associated with the each of the measurements can be expected to be sufficiently similar to each other.

Observations regarding commonality of large scale channel properties between transmissions over different antenna ports by a same node (eNB) resulted in the definition of the "Quasi Co-Location" (QCL) framework in LTE Rel-11. In that framework, different antenna ports may be treated as quasi co-located depending on the transmitter's configuration, but the quasi co-location is wideband and extends indefinitely over time and space. Some embodiments disclosed herein extend the QCL framework by taking advantage of the similarity of transmissions over different time/frequency/spatial resources and determining corresponding actions at the receiver.

Operations at a Receiving Node

Figure 2:
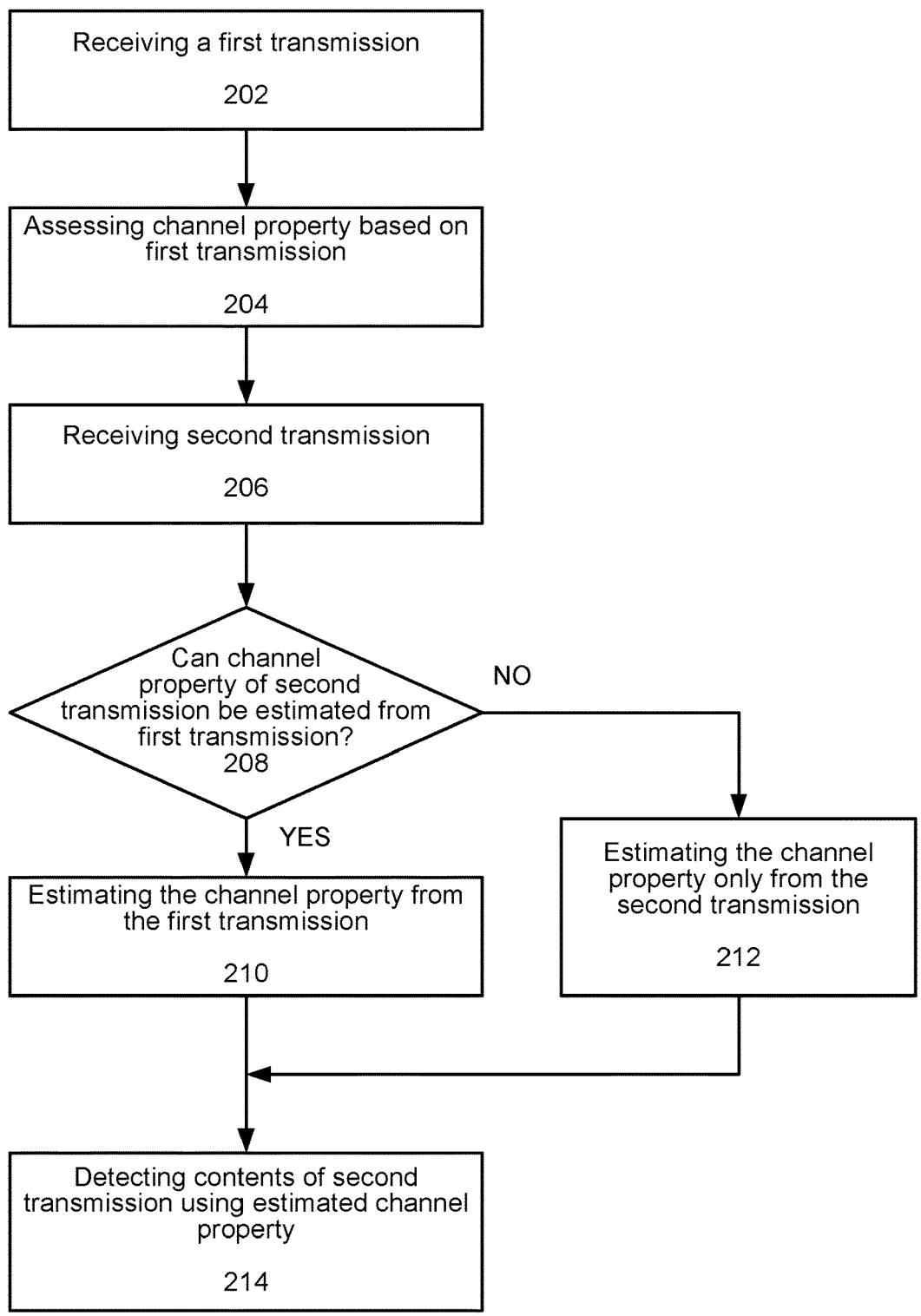

FIG. 2 is a flowchart of operations that may be performed by a receiver according to some embodiments. Referring to FIG. 2, a wireless receiver node may receive (202) a first transmission from a transmitter. The wireless receiver node may be any wireless node in the network illustrated in FIG. 1, but in particular may be a UE 100 engaged in D2D communications. The transmitter may likewise be a UE engaged in D2D communications. The wireless receiver node assesses (204) a large scale channel property of the transmission channel between the transmitter and the receiver. The large scale channel property may be one of a channel gain, a received power, a Doppler spread, a Doppler shift and/or a delay spread. The first transmission received by the wireless receiver node may, for example, be a subframe of a D2D transmission.

The wireless receiver node then receives (206) a second transmission from the transmitter. The second transmission may, for example, be a subframe of a D2D transmission.

Next, the wireless receiver determines (208) whether a large scale channel property of the second transmission can be estimated or inferred from the first transmission. Stated differently, the wireless receiver may determine whether the first transmission and the second transmission are quasi co-located with respect to at least one large scale channel property.

If a large scale channel property of the second transmission can be estimated or inferred from the first transmission, the wireless receiving node then estimates (210) the large scale channel property from the first transmission. Otherwise, if a large scale channel property of the second transmission cannot be estimated or inferred from the first transmission, the large scale channel property may be estimated (212) from only the second transmission.

The contents of the second transmission are then detected (214) using the inferred large scale channel property.

Referring to FIG. 3, the determination at block 208 of whether a large scale channel property of the second transmission can be estimated or inferred from the first transmission may be based on a determination (302) that the transmission resources used for the second and first transmissions are sufficiently close in the time and/or frequency domains. For example, if the second transmission occurs in a subframe contiguous to the first transmission, it may be determined that a large scale channel property is common to both transmissions. That is, it may be determined that a large scale channel property of the second transmission can be estimated from the large scale channel property associated with the first transmission. Likewise, if the second transmission occurs over the same bandwidth as the first transmission, it may determined that a large scale channel property is common to both transmissions.

In a specific example referring again to FIG. 2, a wireless receiving node may determine whether channel gain (or received power) for a second transmission may be estimated or inferred from a first transmission. If it is determined at block 208 that that the received power of the second transmission cannot be estimated or inferred from the received power of the first transmission, the wireless receiving node may process an initial part of the second transmission, such as a first symbol or group of symbols of a subframe, in order to determine the signal power. The wireless receiving node may then adjust AGC accordingly. Only the remaining part of the second transmission may then be used for data reception.

If it is determined at block 208 that that the received power of the second transmission can be estimated from the received power of the first transmission, the wireless receiving node may use the received power determined from processing the first transmission to adjust the AGC for processing the second transmission. The full second transmission may then be used for data reception, which can reduce the overhead of the second transmission and increase throughput.

In a further embodiment, referring to FIG. 4, if it is determined at block 208 of FIG. 2 that that the received power of the second transmissions can be estimated from the received power of the first transmission, the wireless receiving node may estimate (410) the signal power from both the first and second transmissions. For example, the wireless receiving node may process a smaller initial part of the second transmission in order to determine the signal power based on both the first and second transmissions. The wireless receiving node may then adjust AGC based on the determined signal power. The remaining part of the second transmission is then used for data reception. However, because only a smaller initial part of the second transmission is used to determine the signal power, the overhead of the second transmission may still be reduced, and throughput of the transmission may be increased.

Operations at a Scheduler Node

In some embodiments a scheduler node in a wireless communication network may take into account the expected receiver behavior and may control the transmission format to increase the probability that a large scale property of a first transmission can be used to estimate the same large scale property of a subsequent transmission, that is, that first and second transmissions can be perceived at the receiver as quasi co-located transmissions. For example, a scheduler may purposely schedule first and second transmissions such that they are close enough in a dimension, such as in time, frequency and/or space, that they will be regarded at the receiving node as quasi co-located transmissions. Within the embodiment "close enough" may be interpreted as close enough relative to a large scale parameter. For example, two positions and/or times and/or frequencies are considered to be close enough with relative to a large scale parameter if the value of that parameter is approximately the same between the two positions or times or frequencies, respectively.

A scheduler implemented in a transmitting node may predict that first and second transmissions by the transmitting node may be perceived at a receiver as quasi co-located transmissions. The scheduler may control the transmission formats of first and second transmissions to take advantage of this knowledge. In some embodiments, the transmitting node may avoid sending AGC-specific symbols (i.e. symbols that would otherwise be used for AGC at the receiver) in the second transmission, and may instead schedule regular data in its place.

Figure 5:
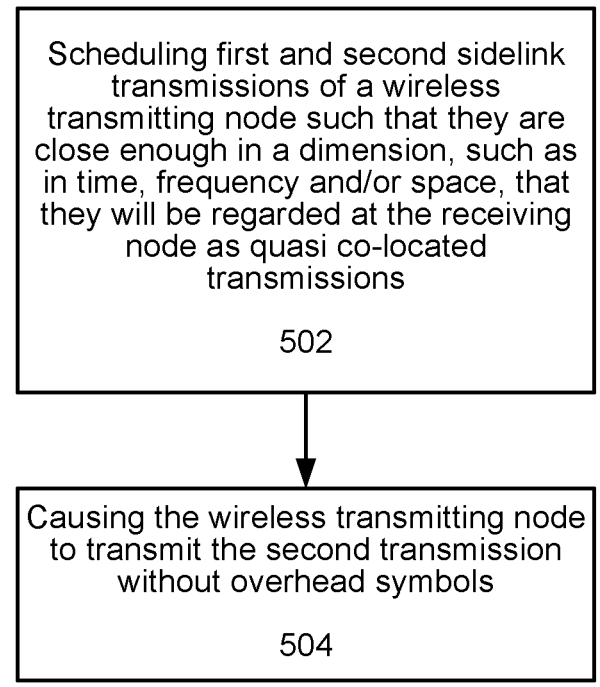

Accordingly, a method of operating a scheduler is illustrated in FIG. 5. Referring to FIG. 5, the method includes scheduling (502) first and second sidelink transmissions of a wireless transmitting node such that they are close enough in a dimension, such as in time, frequency and/or space, that they will be regarded at the receiving node as quasi co-located transmissions, and causing (504) the wireless transmitting node to transmit the second transmission without overhead symbols, such as AGC-specific symbols.

Figure 6:
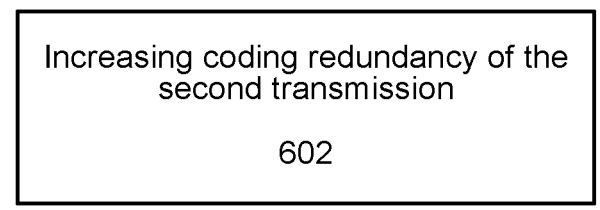

Moreover, referring to FIG. 6, because the scheduler knows that fewer resources in the second transmission may be used for AGC adjustment by the receiver (and therefore more resources can be used for data reception), the scheduler can instruct the transmitting node to add (602) more redundancy to the data of the second transmission for better protection, such as by applying an error correcting code with a lower (more redundant) code rate (k/n) to data in the second transmission, where k is the number of useful bits in a transmission and n is the total number of bits in the transmission.

In another example, the scheduler may be implemented in a separate scheduler node (i.e., a different network node than the wireless transmitting node, such as in a centralized scheduler in the network). The scheduler may instruct the transmitting node to control the transmission formats of the quasi co-located transmissions to increase throughput, redundancy or some other aspect of the transmission.

Example User Equipment and Network Node

Figure 7:
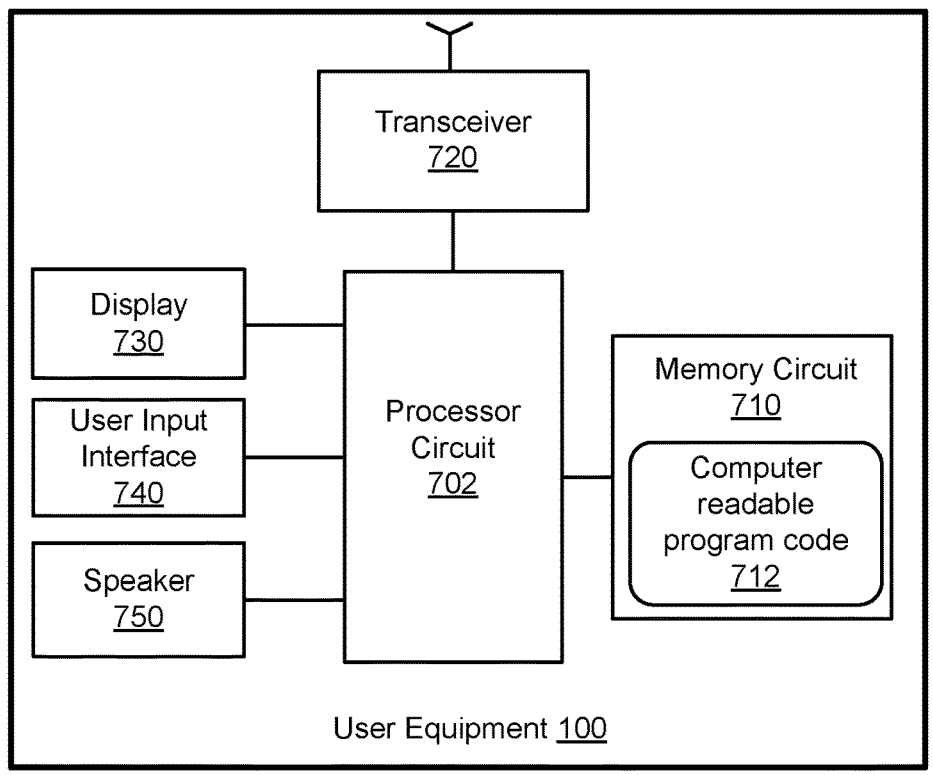
FIG. 7 is a block diagram of a UE, for use in a telecommunications system, that is configured to perform operations according to one or more embodiments disclosed herein.

FIG. 7 is a block diagram of a UE 100, for use in a telecommunications system, that is configured to perform operations according to one or more embodiments disclosed herein. The UE 100 includes a transceiver circuit 720, a processor circuit 702, and a memory circuit 710 containing computer readable program code 712. The UE 100 may further include a display 730, a user input interface 740, and a speaker 750.

The transceiver 720 is configured to communicate with other UEs, which as explained in connection with FIG. 1 may correspond to infrastructure mounted devices, vehicle mounted/carried devices, infrastructure mounted devices (e.g., network nodes), pedestrian carried devices, etc., through a wireless air interface using one or more of the radio access technologies. The processor circuit 702 may include one or more data processing circuits, such as a general purpose and/or special purpose processor, e.g., microprocessor and/or digital signal processor. The processor circuit 702 is configured to execute the computer readable program code 712 in the memory circuit 710 to perform at least some of the operations described herein as being performed by a UE 100.

Figure 8:
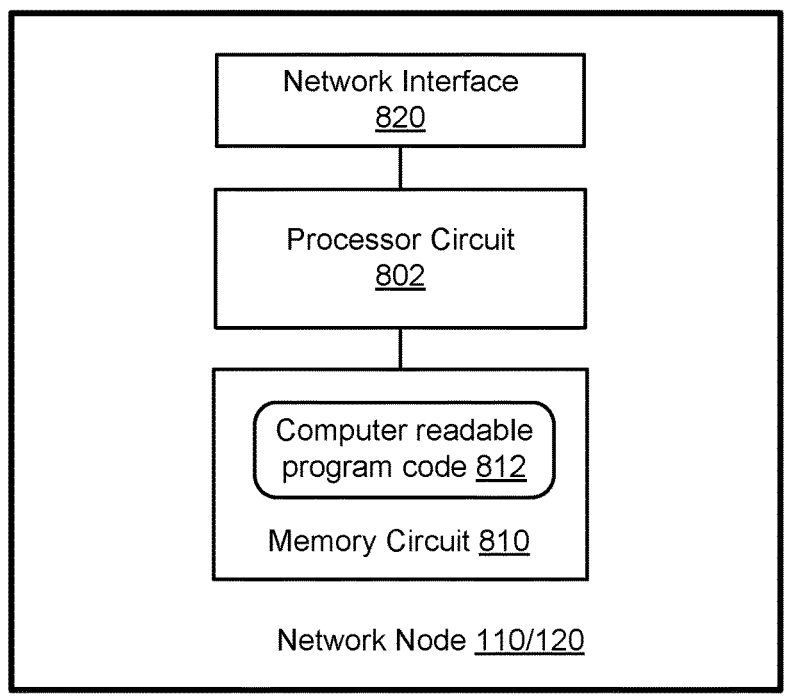
FIG. 8 is a block diagram of a network node, for use in a telecommunications system, that is configured according to one or more embodiments disclosed herein for a network node.

FIG. 8 is a block diagram of a network node may correspond to a radio network node 120 (e.g., eNB) and/or the scheduler network node 110. The network node 120/110 is configured for use in a telecommunications system according to one or more embodiments disclosed herein for a network node. The network node 120/110 can include a network interface 820 (e.g., wired network interface and/or wireless transceiver), a processor circuit 802, and a memory circuit 810 containing computer readable program code 812.

The processor circuit 802 may include one or more data processing circuits, such as a general purpose and/or special purpose processor, e.g., microprocessor and/or digital signal processor, that may be collocated or distributed across one or more networks. The processor circuit 802 is configured to execute the computer readable program code 812 in the memory 810 to perform at least some of the operations and methods of described herein as being performed by a network node. The network interface 820 communicates with UEs 100 directly or indirectly.

Example Modules

Figure 9:
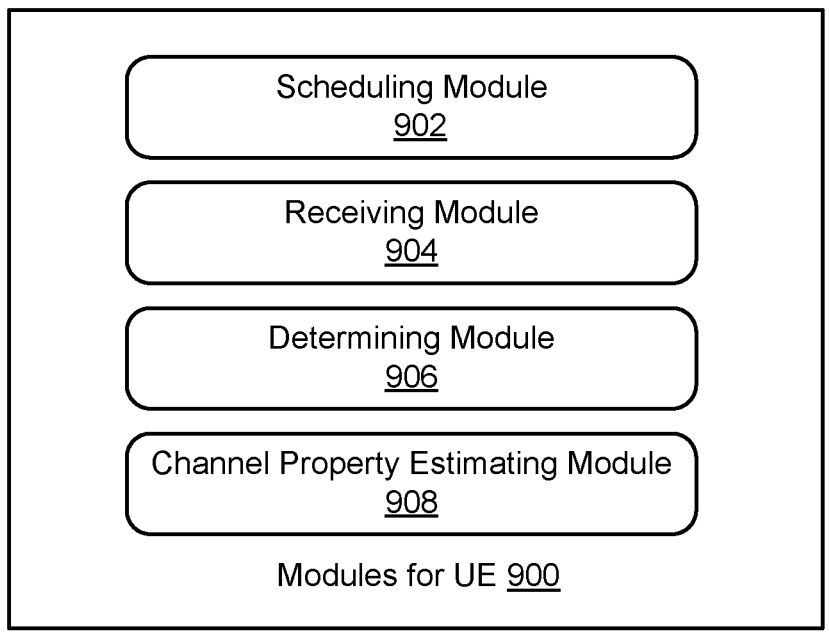
FIG. 9 illustrates modules residing in a UE of a telecommunications system that perform operations as disclosed herein according to some embodiments.

FIG. 9 illustrates modules 900 for a UE that perform operations as disclosed herein according to some embodiments. The modules 900 include a scheduling module 902, a receiving module 904, a determining module 906, and a channel property estimating module 908. The scheduling module 902 schedules transmissions by wireless transmitting nodes, such as the UE 100 in the network. The receiving module 904 receives the first and second transmissions. The determining module 906 determines if a channel property of the second transmission can be estimated from a corresponding channel property of the first transmission. The channel property estimating module 908 estimates the channel property based on the corresponding channel property of the first transmission and/or based on the second transmission.

Figure 10:
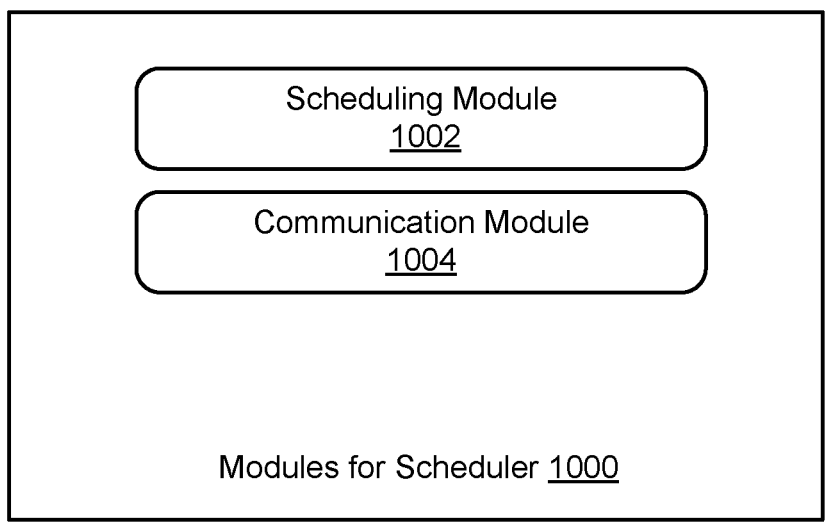
FIG. 10 illustrates modules residing in a scheduler of a telecommunications system that perform operations as disclosed herein according to some embodiments.

FIG. 10 illustrates modules 1000 for a network node that perform operations as disclosed herein according to some embodiments. The modules 1000 include a scheduling module 1002, and a communication module 1004. The scheduling module 1002 schedules transmissions by wireless transmitting nodes, such as the UE 100 in the network. The communication module 1004 causes a wireless transmitting node to transmit first and second sidelink transmissions such that they are close enough in a dimension that they will be regarded at the receiving node as quasi co-located transmissions, and to transmit the second transmission without an overhead symbol that is present in the first transmission.

Further Embodiments

In a wireless communication system, it is sometimes necessary for a transmitting node to retransmit one or more subframes, for example, if the subframes were not correctly decoded at the receiver. However, the number of subframes that can be re-transmitted in a single transmission may be limited in a network by congestion control procedures.

Congestion control aims to prevent the radio channel from being congested by too many transmissions within a certain geographical area. This is achieved by placing limits on several transmitter parameters based on channel occupancy level at the moment. For example, the draft proposal ETSI EN 302 571 V2.0.0 (2016-03) for the 5.9 GHz ITS band in Europe specifies regulatory limits on maximum Ton, minimum Toff and maximum duty cycle of UE transmitters based on the channel occupancy level measured as Channel Busy Ratio (CBR), where Ton is the current duration of a transmission, Toff is the current allowed minimum time between two consecutive transmissions, and duty cycle is the ratio expressed as a percentage of the maximum transmitter "on" time on one carrier frequency, relative to 1 second.

The minimum Ton limit specified in the proposal is 4 ms, which implies that a UE might be able to transmit 4 retransmissions within the allowed time budget. Unfortunately, the presence of a guard period (GP), or gap, at the end of sidelink subframes makes the transmission of consecutive subframes discontinuous and precludes such possibility. That is, because of the presence of the guard period in each subframe, transmission of multiple adjacent subframes from a UE cannot be considered as a single transmission from the radio point of view. It may be important for LTE UEs to be able to transmit up to four adjacent retransmissions. Some embodiments described herein would adapt the LTE specifications to enable up to four adjacent retransmissions in a sidelink channel. In particular, some embodiments described herein modify the LTE sidelink design in order to enable adjacent retransmissions while meeting ETSI requirements.

According to some embodiments, in the event a transmission from a UE consists of multiple co-scheduled adjacent subframes, e.g. due to multiple data retransmissions, the UE does not insert guard periods (gaps) between the co-scheduled adjacent subframes. Gaps may be provided as usual for transmissions that are not adjacent in time. When a UE transmits multiple adjacent sidelink subframes, a gap may only be inserted at the end of the contiguous transmission. Data transmission may not be truncated in the last symbols that do not carry a gap.

Figure 11A:
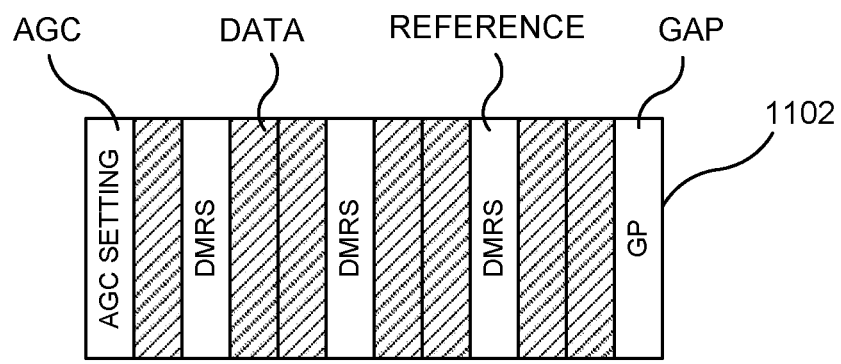
FIGS. 11A-C and 12 illustrate transmission of data on subframes that are adjacent in time.
Figure 11B:
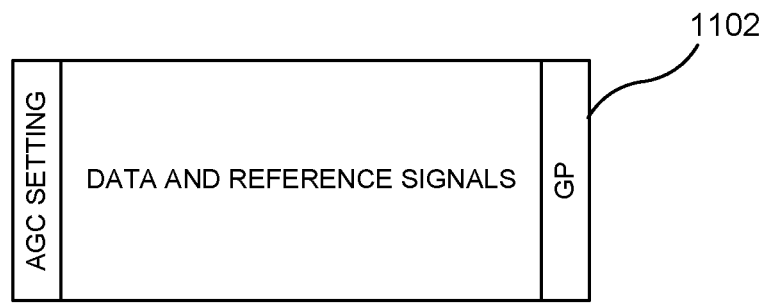

FIGS. 11A and 11B illustrate a single subframe 1102 of a sidelink transmission. As shown therein, the subframe 1102 includes a leading AGC setting symbol followed by a plurality of data symbols and demodulation reference signal (DMRS) symbols. A guard period, GP, is provided at the end of the subframe 1102.

According to some embodiments, when a sidelink transmission includes multiple adjacent (i.e., contiguous in time) subframes, an overhead symbol, such as a guard period and/or an AGC symbol, that would otherwise be included between the adjacent subframes, may be omitted from the transmission.

Figure 11C:
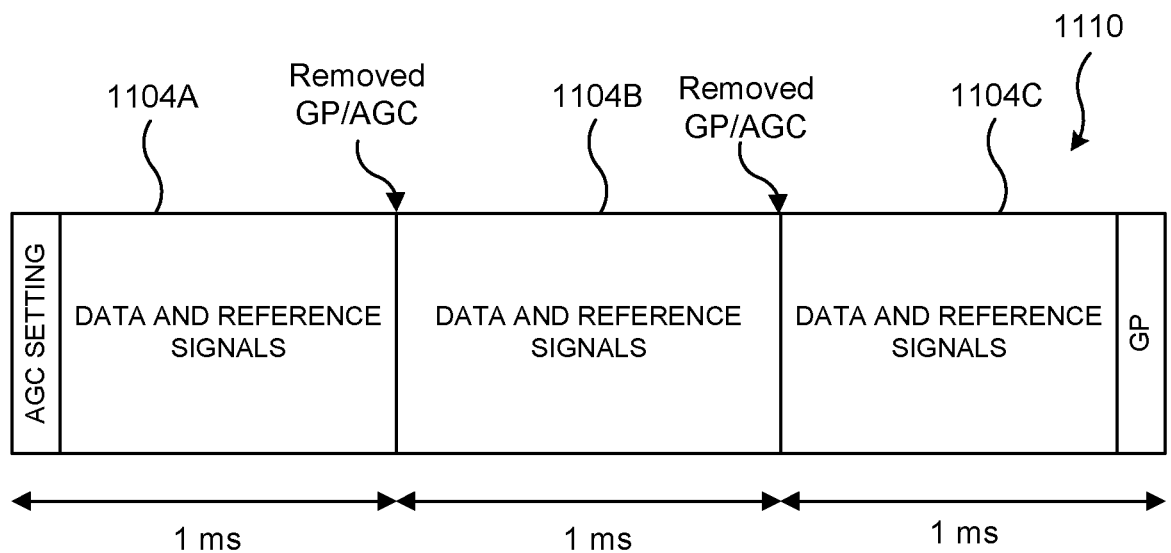

For example, FIG. 11C shows an example of a transmission 1110 consisting of three adjacent subframes 1104A, 1104B, 1104C, in the same bandwidth (i.e., transmitted using the same carrier frequency). The guard periods are omitted from between the first and second subframes 1104A, 1104B and the second and third subframes 1104B, 1104C, and AGC symbols are omitted from the beginning of the second and third subframes 1104B, 1104C. Thus, only the last symbol in the transmission is a guard period, and an AGC symbol is transmitted only once at the beginning of the transmission. AGC training for the second and third subframes is performed based on the AGC symbol at the beginning of the first subframe.

Figure 12:
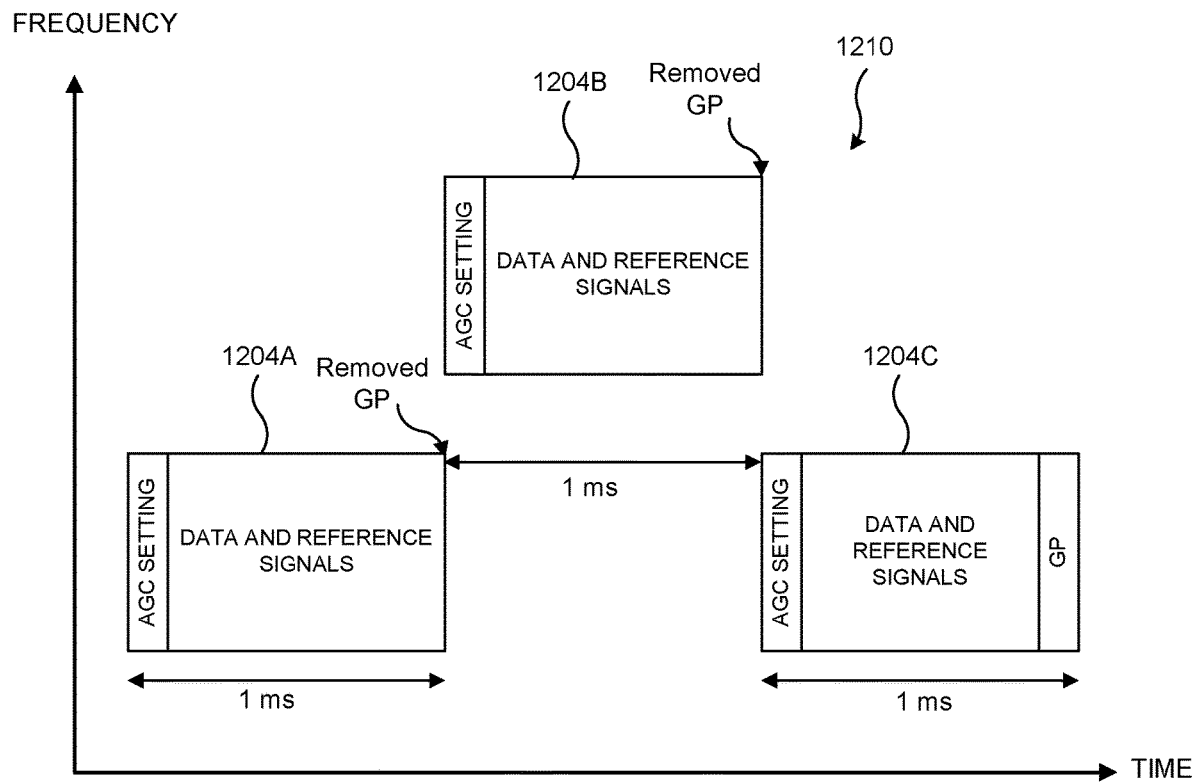

FIG. 12 shows an example of a transmission 1210 of three adjacent subframe retransmissions 1204A, 1204B, 1204C of the same transmission block over different frequency bands. The guard period GP is removed from the end of the first and second subframes 1204A, 1204B. In this example, only the last symbol is a guard period, and AGC is trained for each of the subframes.

A receiver according to some embodiments may take advantage of the lack of truncation of last OFDM symbol whenever possible. For example, if a transmission block is retransmitted over the same bandwidth and adjacent to a previous (re)transmission of the same transmission block, the receiving UE should use the first OFDM symbol in the retransmission for data detection. In all other cases, the UE may use the first OFDM symbol for AGC training.

Figure 13:
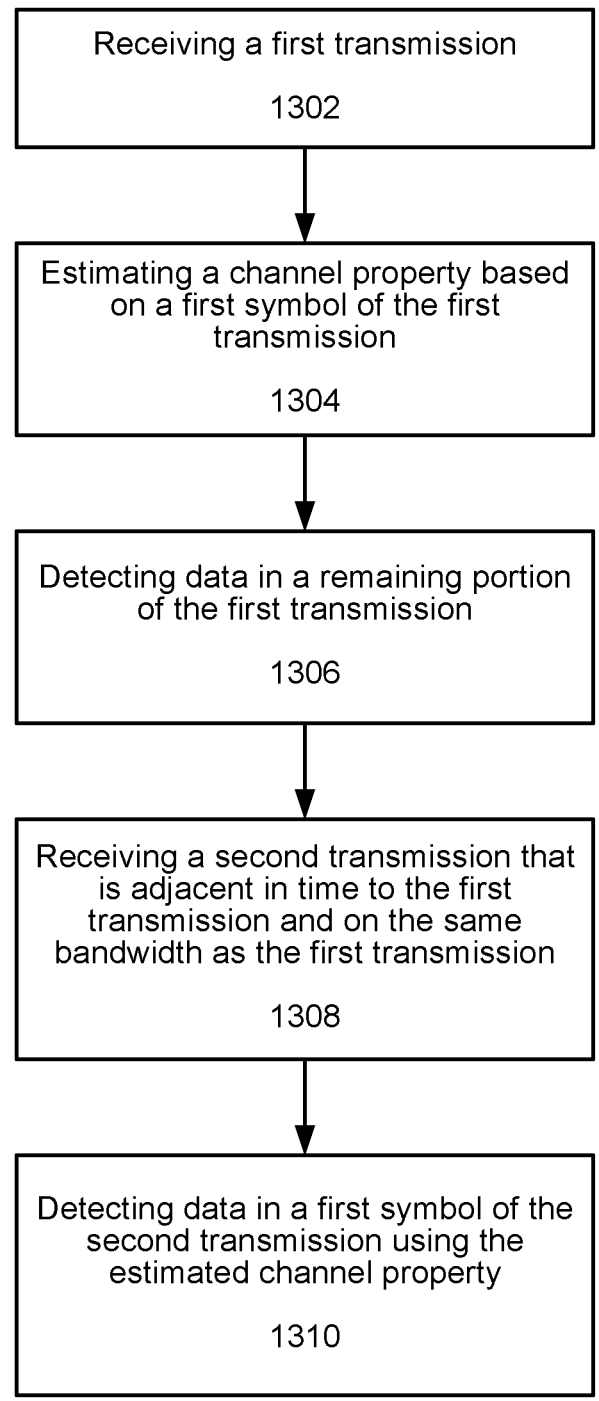

A method in a receiver according to some embodiments is illustrated in FIG. 13. As shown therein, the method includes receiving (1302) a first transmission; estimating (1304) a channel property based on a first symbol of the first transmission; detecting (1306) data in a remaining portion of the first transmission; receiving (1308) a second transmission that is adjacent in time to the first transmission and on the same bandwidth as the first transmission; and detecting (1310) data in a first symbol of the second transmission using the estimated channel property.

Referring to FIG. 14, a method of a transmitting node includes transmitting (1402) first and second contiguous subframes to a receiver over a wireless communication channel. An overhead symbol, such as a guard period and/or an AGC training symbol, that would otherwise be transmitted between the subframes may be omitted.

Referring to FIG. 15, a method of a receiving node includes receiving (1502) first and second contiguous subframes over a wireless communication channel and detecting (1504) data in the second subframe based on an AGC symbol in the first subframe.

In these proposed embodiments, the impact of the maximum Ton limit on UE transmitter behavior is addressed, and solutions for fulfilling the respective Ton requirement are provided.

Abbreviations and Explanations:
3G Third Generation of Mobile Telecommunications Technology
BSM Basic Safety Message
BW Bandwidth
BSR Buffer Status Report
CAM Cooperative Awareness Message
CBR Channel Busy Radio
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
ITS Intelligent Transport System
LTE Long-Term Evolution
NW Network
RS Reference Signals
TB Transmission Block
TF Transport Format
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine
wrt with respect to
SPS Semi Persistent Scheduling
DMRS Demodulation reference signals
OCC Orthogonal cover code
PDCCH Physical Downlink Control Channel
DBS Delay-Based Scheduler
MAC Medium Access Control
MAC CE MAC Control Element
PUSCH Physical Uplink Shared Channel
PUCCH Physical Uplink Control Channel
PDU Packet Data Unit
3GPP Third Generation Partnership Project
LCD Logical Channel Identity
RRC Radio Resource Control
IP Internet Protocol
PPPP ProSe Per Packet Priority
ProSe Proximity Services
PRB Physical Resource Block
TTI Transmission Timing Interval Further Definitions and Embodiments:

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.—

Embodiment 1

A method by a user equipment, UE, comprising: receiving a first transmission; assessing a channel property of the first transmission; receiving a second transmission; determining if a corresponding channel property of the second transmission can be estimated based on the channel property of the first transmission; in response to determining that the corresponding channel property of the second transmission can be estimated based on the channel property of the first transmission, estimating the corresponding channel property of the second transmission based on the channel property of the first transmission; and detecting the second transmission using the estimated corresponding channel property of the second transmission.

Embodiment 2

The method of embodiment 1, further comprising: in response to determining that the corresponding channel property of the second transmission cannot be estimated based on the channel property of the first transmission, estimating the corresponding channel property of the second transmission based on the second transmission.

Embodiment 3

The method of any previous embodiment, wherein estimating the corresponding channel property of the second transmission comprises estimating the corresponding channel property of the second transmission based on the channel property of the first transmission and based on the second transmission.

Embodiment 4

The method of any previous embodiment, wherein the channel property of the first transmission and the corresponding channel property of the second transmission comprise a large scale channel property.

Embodiment 5

The method of any previous embodiment, wherein the channel property of the first transmission and the corresponding channel property of the second transmission comprise at least one of a channel gain, a received power, a Doppler spread, a Doppler shift and a delay spread.

Embodiment 6

The method of any previous embodiment, wherein determining if a corresponding channel property of the second transmission can be estimated based on the channel property of the first transmission comprises determining that transmission resources used for the first and second transmissions are sufficiently close in the time and/or frequency domains that a large scale channel property is common to both transmissions.

Embodiment 7

The method of any previous embodiment, wherein determining if a corresponding channel property of the second transmission can be estimated based on the channel property of the first transmission comprises determining that spatial precoders used for the first and second transmissions are sufficiently close that a large scale channel property is common to both transmissions.

Embodiment 8

The method of any previous embodiment, wherein determining if a corresponding channel property of the second transmission can be estimated based on the channel property of the first transmission comprises determining that the first and second transmissions comprise contiguous subframes.

Embodiment 9

The method of any previous embodiment, wherein determining if a corresponding channel property of the second transmission can be estimated based on the channel property of the first transmission comprises determining that the first and second transmissions utilize the same bandwidth.

Embodiment 10

The method of any previous embodiment, wherein the channel property comprises received power, the method further comprising:
in response to determining that the corresponding channel property of the second transmission cannot be estimated based on the channel property of the first transmission, adjusting an automatic gain control based on an initial portion of the second transmission.

Embodiment 11

A user equipment, UE configured to perform the method of any of Embodiments 1 through 10.

Embodiment 12

A user equipment, UE comprising: a transceiver; at least one processor circuit; and at least one memory coupled to the at least one processor circuit and the transceiver, and storing program code that when executed by the at least one processor circuit causes the at least one processor circuit to perform operations comprising: receiving a first transmission; assessing a channel property of the first transmission; receiving a second transmission; determining if a corresponding channel property of the second transmission can be estimated based on the channel property of the first transmission; in response to determining that the corresponding channel property of the second transmission can be estimated based on the channel property of the first transmission, estimating the corresponding channel property of the second transmission based on the channel property of the first transmission; and detecting the second transmission using the estimated corresponding channel property of the second transmission.

Embodiment 13

A method by a scheduler in a network node (100, 110, 120), comprising: scheduling first and second sidelink transmissions of a wireless transmitting node such that they are close enough in a dimension that they will be regarded at a wireless receiving node as quasi co-located transmissions; and causing the wireless transmitting node to transmit the second sidelink transmission to the wireless receiving node without at least one overhead symbol that is present in the first transmission.

Embodiment 14

The method of embodiment 13, wherein the dimension comprises time, frequency and/or space.

Embodiment 15

The method of embodiment 13 or 14, further comprising causing the wireless transmitting node to increase a coding redundancy of the second transmission.

Embodiment 16

The method of any of embodiments 12-15, wherein the at least one overhead symbol comprises an automatic gain control, AGC, training symbol.

Embodiment 17

The method of any of embodiments 12-15, wherein the at least one overhead symbol comprises a guard period, GP.

Embodiment 18

The method of any of embodiments 12-17, further comprising transmitting a data symbol in place of the at least one overhead symbol.

Embodiment 19

A user equipment, UE configured to perform the method of any of Embodiments 12 through 18.

Embodiment 20

A network node (110, 120) configured to perform the method of any of Embodiments 12 through 18.

Embodiment 21

A network node (110, 120) comprising: at least one processor circuit; and at least one memory coupled to the at least one processor circuit and storing program code that when executed by the at least one processor circuit causes the at least one processor circuit to perform operations comprising: scheduling first and second sidelink transmissions of a wireless transmitting node such that they are close enough in a dimension that they will be regarded at a wireless receiving node as quasi co-located transmissions; and causing the wireless transmitting node to transmit the second sidelink transmission to the wireless receiving node without at least one overhead symbol that is present in the first sidelink transmission.

Embodiment 22

A method by a user equipment, UE, comprising: receiving a first transmission; estimating a channel property based on a first symbol of the first transmission; detecting data in a remaining portion of the first transmission; receiving a second transmission that is adjacent in time to the first transmission and on the same bandwidth as the first transmission; and detecting data in a first symbol of the second transmission using the estimated channel property.

Embodiment 23

The method of embodiment 22, wherein the channel property comprises a large scale channel property.

Embodiment 24

The method of embodiment 22 or 23, wherein the channel property comprises at least one of a channel gain, a received power, a Doppler spread, a Doppler shift and a delay spread.

Embodiment 25

The method of any of embodiments 22-24, wherein detecting data in the remaining portion of the first transmission comprises detecting data in a last symbol of the first transmission that is immediately contiguous with a first symbol of the second transmission.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present inventive concepts.

What is claimed is:

1. A method by a user equipment, UE, comprising:
   receiving a first transmission;
   assessing a channel property of the first transmission;
   receiving a second transmission;
   determining if a corresponding channel property of the second transmission can be estimated based on the channel property of the first transmission;
   in response to determining that the corresponding channel property of the second transmission can be estimated based on the channel property of the first transmission, estimating the corresponding channel property of the second transmission based on the channel property of the first transmission; and
   detecting the second transmission using the estimated corresponding channel property of the second transmission;
   wherein determining if a corresponding channel property of the second transmission can be estimated based on the channel property of the first transmission comprises determining that transmission resources used for the first and second transmissions are sufficiently close in time and/or frequency domains that a channel property is common to both transmissions.

2. The method of claim 1, further comprising:
   in response to determining that the corresponding channel property of the second transmission cannot be estimated based on the channel property of the first transmission, estimating the corresponding channel property of the second transmission based on the second transmission.

3. The method of claim 1, wherein estimating the corresponding channel property of the second transmission comprises estimating the corresponding channel property of the second transmission based on the channel property of the first transmission and based on the second transmission.

4. The method of claim 1, wherein determining if a corresponding channel property of the second transmission can be estimated based on the channel property of the first transmission comprises determining that spatial precoders used for the first and second transmissions are sufficiently close that a large scale channel property is common to both transmissions.

5. The method of claim 1, wherein determining if a corresponding channel property of the second transmission can be estimated based on the channel property of the first transmission comprises determining that the first and second transmissions comprise contiguous subframes.

6. The method of claim 1, wherein determining if a corresponding channel property of the second transmission can be estimated based on the channel property of the first transmission comprises determining that the first and second transmissions utilize the same bandwidth.

7. The method of claim 1, wherein the channel property comprises received power level, the method further comprising:
in response to determining that the corresponding channel property of the second transmission cannot be estimated based on the channel property of the first transmission, adjusting an automatic gain control based on an initial portion of the second transmission.

8. A non-transitory computer readable storage medium comprising computer program instructions that, when executed on a processing circuit, cause the processing circuit to perform the method according to claim 1.

9. A user equipment, UE comprising:
a transceiver;
at least one processor circuit; and
at least one memory coupled to the at least one processor circuit and the transceiver, and storing program code that when executed by the at least one processor circuit causes the at least one processor circuit to perform operations comprising:
receiving a first transmission;
assessing a channel property of the first transmission;
receiving a second transmission;
determining if a corresponding channel property of the second transmission can be estimated based on the channel property of the first transmission;
in response to determining that the corresponding channel property of the second transmission can be estimated based on the channel property of the first transmission, estimating the corresponding channel property of the second transmission based on the channel property of the first transmission; and
detecting the second transmission using the estimated corresponding channel property of the second transmission;
wherein determining if a corresponding channel property of the second transmission can be estimated based on the channel property of the first transmission comprises determining that transmission resources used for the first and second transmissions are sufficiently close in time and/or frequency domains that a channel property is common to both transmissions.

10. The user equipment of claim 9, wherein the at least one processor circuit estimates the corresponding channel property of the second transmission by estimating the corresponding channel property of the second transmission based on the channel property of the first transmission and based on the second transmission.

11. The user equipment of claim 9, wherein the channel property of the first transmission and the corresponding channel property of the second transmission comprise a large scale channel property.

12. The user equipment of claim 9, wherein the channel property of the first transmission and the corresponding channel property of the second transmission comprise at least one of a channel gain, a received power level, a Doppler spread, a Doppler shift and a delay spread.

13. A method by a scheduler, comprising:
scheduling first and second sidelink transmissions of a wireless transmitting node such that they are close enough in a dimension that they will be regarded at a wireless receiving node as quasi co-located transmissions; and
causing the wireless transmitting node to transmit the second sidelink transmission to the wireless receiving node without at least one overhead symbol that is present in the first transmission.

14. The method of claim 13, further comprising causing the wireless transmitting node to increase a coding redundancy of the second transmission.

15. The method of claim 13, further comprising transmitting a data symbol in place of the at least one overhead symbol.

16. A non-transitory computer readable storage medium comprising computer program instructions that, when executed on a processing circuit, cause the processing circuit to perform the method according to claim 13.

17. An apparatus, comprising:
at least one processor circuit; and
at least one memory coupled to the at least one processor circuit and storing program code that when executed by the at least one processor circuit causes the at least one processor circuit to perform operations comprising:
scheduling first and second sidelink transmissions of a wireless transmitting node such that they are close enough in a dimension that they will be regarded at a wireless receiving node as quasi co-located transmissions; and
causing the wireless transmitting node to transmit the second sidelink transmission to the wireless receiving node without at least one overhead symbol that is present in the first sidelink transmission.

18. The apparatus of claim 17, wherein the dimension comprises time, frequency and/or space.

19. The apparatus of claim 17, wherein the at least one overhead symbol comprises one of an automatic gain control, AGC, training symbol and a guard period, GP.

20. The apparatus of claim 17, wherein the apparatus comprises a user equipment or a network node.

* * * * *